US012780006B2

(12) United States Patent
Moia et al.

(10) Patent No.: US 12,780,006 B2
(45) Date of Patent: Nov. 3, 2026

(54) METHOD FOR OPERATING A BRAKE-SUPPORT SYSTEM FOR AN ELECTRIC MOTORCYCLE

(71) Applicant: Robert Bosch GmbH, Stuttgart (DE)

(72) Inventors: Alessandro Moia, Holzgerlingen (DE); Silas Klug, Magstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 146 days.

(21) Appl. No.: 18/558,224

(22) PCT Filed: Jun. 14, 2022

(86) PCT No.: PCT/EP2022/066093
§ 371 (c)(1),
(2) Date: Oct. 31, 2023

(87) PCT Pub. No.: WO2023/011787
PCT Pub. Date: Feb. 9, 2023

(65) Prior Publication Data

US 2024/0227573 A1 Jul. 11, 2024

(30) Foreign Application Priority Data

Aug. 6, 2021 (DE) .................... 10 2021 208 582.2

(51) Int. Cl.
*B60L 7/26* (2006.01)
*B60L 3/10* (2006.01)

(52) U.S. Cl.
CPC ................ *B60L 7/26* (2013.01); *B60L 3/108* (2013.01); *B60L 2200/12* (2013.01)

(58) Field of Classification Search
CPC .... B60L 3/108; B60L 7/24; B60L 7/26; B60L 2200/12
See application file for complete search history.

(56) References Cited

U.S. PATENT DOCUMENTS

2011/0233994 A1 9/2011 Harding et al.
2012/0138375 A1 6/2012 Hughes
(Continued)

FOREIGN PATENT DOCUMENTS

AT 012010 U2 9/2011
CN 106364333 A 2/2017
(Continued)

OTHER PUBLICATIONS

Okumura, JP 2007-106385, machine translation. (Year: 2007).*
(Continued)

*Primary Examiner* — Mark L. Greene
(74) *Attorney, Agent, or Firm* — NORTON ROSE FULBRIGHT US LLP

(57) ABSTRACT

A method for operating a brake-support system for an electric motorcycle. The method includes: determining a total braking torque required to brake the electric motorcycle; determining a motor torque to be generated using an electric motor of the electric motorcycle, on the basis of the total braking torque and a maximum braking torque that can be generated using a brake system of the electric motorcycle; and, if the maximum braking torque is generated, generating a control command for controlling the electric motor so that the motor torque is generated together with the maximum braking torque.

9 Claims, 2 Drawing Sheets

(56) References Cited

U.S. PATENT DOCUMENTS

| | | | |
|---|---|---|---|
| 2018/0093571 | A1 | 4/2018 | Hall et al. |
| 2019/0233048 | A1 | 8/2019 | Takayama et al. |

FOREIGN PATENT DOCUMENTS

| | | | | | |
|---|---|---|---|---|---|
| CN | 112248818 | A | * | 1/2021 | ................ B60L 7/10 |
| DE | 4435953 | A1 | | 5/1995 | |
| DE | 102015122098 | A1 | | 9/2016 | |
| EP | 2644434 | A1 | * | 10/2013 | ............. B60L 7/003 |
| JP | 2002067907 | A | | 3/2002 | |
| JP | 2004268901 | A | | 9/2004 | |
| JP | 2004322810 | A | | 11/2004 | |
| JP | 2007106385 | A | * | 4/2007 | |
| WO | 2012070104 | A1 | | 5/2012 | |
| WO | 2020118233 | A1 | | 6/2020 | |

OTHER PUBLICATIONS

You, CN 112248818, machine translation. (Year: 2013).*
International Search Report for PCT/EP2022/066093, Issued Nov. 3, 2022.

* cited by examiner

METHOD FOR OPERATING A BRAKE-SUPPORT SYSTEM FOR AN ELECTRIC MOTORCYCLE

FIELD

The present invention relates to a method for operating a brake-support system for an electric motorcycle. Furthermore, the present invention relates to a control unit, a computer program, and a computer-readable medium for performing such a method and to a brake-support system which is equipped with such a control unit.

BACKGROUND INFORMATION

An ABS system generally comprises various hydraulic and electric components for brake pressure control. For example, a very simple ABS system can already be realized with the aid of an inlet valve, an outlet valve, a storage chamber and a check valve.

In the case of electric motorcycles driven by an electric motor, there is in principle the possibility of using the electric motor for torque modulation. However, in practice, depending on the vehicle type or the size of the electric motor, the problem can arise that the maximum torque that can be generated by the electric motor is not sufficient on its own to fulfill the requirements of an ABS system.

SUMMARY

The present invention provides a method for operating a brake-support system for an electric motorcycle, a corresponding control unit, a corresponding brake-support system, a corresponding computer program, and a corresponding computer-readable medium. Advantageous developments and improvements of the present invention are disclosed herein.

Embodiments of the present invention make it possible to brake an electric motorcycle by a combination of an electric-motor-driven with a non-electric-motor-driven braking function, for example a hydraulic braking function. In this way, a corresponding brake-support system for the electric motorcycle can be provided very cost-effectively, for example by being able to reduce the number of hydraulic components of the brake-support system. In addition, the braking power of the electric motorcycle can be improved.

A first aspect of the present invention relates to a computer-implemented method for operating a brake-support system for an electric motorcycle. According to an example embodiment of the present invention, the method comprises at least the following steps: determining a total braking torque required to brake the electric motorcycle; determining a motor torque to be generated by means of an electric motor of the electric motorcycle, on the basis of the total braking torque and a maximum braking torque that can be generated by means of a brake system of the electric motorcycle; and, if the maximum braking torque is generated, generating a control command for controlling the electric motor so that the motor torque is generated together with the maximum braking torque.

The term “electric motorcycle” can generally be understood to mean a single-track vehicle or two-wheeler with a drive in the form of an electric motor or a combination of an electric motor and an internal combustion engine. The electric motorcycle can also be an electric scooter, an electric bicycle or a motorcycle-like two-track vehicle having more than two wheels, e.g., a quad bike.

The motor torque can be a drive torque or a braking or recuperation torque.

The term “total braking torque” can be understood, for example, to mean a braking torque estimated on the basis of a current rotational wheel speed of one or more wheels of the electric motorcycle and/or a current rotational motor speed of the electric motor. The current rotational wheel speed can be measured, for example, by means of a separate wheel speed sensor. However, a determination of the current rotational wheel speed from the current rotational motor speed is also possible. In this case, a separate wheel speed sensor can be dispensed with.

The total braking torque can be determined so as to avoid blocking of the wheel to which both the maximum braking torque of the brake system and the motor torque of the electric motor are applied, for example during emergency or full braking. The total braking torque can thus be regarded as a braking torque by means of which the electric motorcycle is to be braked and/or brought to a standstill as quickly and safely as possible.

The maximum total braking torque can, for example, be equal to a sum of the maximum braking torque of the brake system and a maximum negative motor torque, i.e., a maximum braking or recuperation torque of the electric motor. The maximum total braking torque should be selected such that the electric motorcycle can be brought to a standstill quickly and safely in any driving situation.

According to an example embodiment of the present invention, it is possible for the electric motor and the brake system to act on one and the same wheel or one and the same wheels of the electric motorcycle, for example on the rear wheel thereof. However, it is also possible for the electric motor to drive the rear wheel while the brake system brakes the front wheel or, in addition, the rear wheel. For example, the brake system can in this case be configured as a single-channel ABS system for the front wheel. The rear wheel can be braked exclusively via the electric motor in the recuperation mode.

The method according to the present invention described here and below makes it possible to use the electric motor for the targeted modulation of the braking torque, wherein, as it were, an average value of this braking torque is provided by the brake system independently of the electric motor. The average value can be reduced or increased in terms of magnitude by generating a drive torque or a braking or recuperation torque by means of the electric motor at the same time or at a slight time offset.

For this purpose, according to an example embodiment of the present invention, it is expedient if the operating point of the brake system is shifted in a corresponding manner, i.e., the maximum braking torque that can be generated by means of the brake system, for example the maximum brake pressure thereof, is suitably adapted to the maximum motor torque of the electric motor. For example, in the simplest case, the brake system can be equipped with a corresponding isolating or pressure limiting valve. Such a valve can be retrofitted very simply.

In particular in the case of electric scooters, the braking or recuperation torque of the electric motor may not be sufficient on its own to brake the electric motorcycle quickly or strongly enough. However, it is advantageous that the electric motor can modulate the motor torque with very high dynamics, which would be quite sufficient for an ABS control.

Since the braking effect achieved via the electric motor is now combined with the braking effect of an additional, for example hydraulic, brake system that is able to provide the required high braking torque, an ABS functionality that satisfies both requirements can be realized with a relatively low cost outlay.

If the brake system and the electric motor are activated simultaneously, in the event of braking, the total braking torque exerted on the relevant wheel results as the sum of the motor torque of the electric motor and the braking torque of the brake system.

If the electric motor generates a positive motor torque during the braking process, it counteracts the brake system and correspondingly reduces the total braking torque acting on the wheel. The brake system defines, as it were, the average value of the braking torque and, by means of the electric motor, the total torque acting on the wheel is then modulated by this average value, i.e., increased or reduced based thereon.

Since a typical (hydraulic) brake system generates a maximum braking torque which is generally significantly greater than the maximum drive torque of a typical electric motor, during full braking, the electric motor would normally not be able to completely cancel the braking torque generated by means of the brake system. However, by installing a corresponding valve into the brake system, it can be ensured that, on the one hand, the sum of the limited maximum braking torque of the brake system and the maximum braking torque of the electric motor corresponds to the maximum total braking torque required for emergency braking, and, on the other hand, the limited maximum braking torque of the brake system can be compensated for completely by the maximum drive torque of the electric motor so that in this case the total torque acting on the relevant wheel is equal to zero.

By means of such a limitation, it is thus possible to modulate the total braking torque between zero and the maximum braking torque required for emergency braking, by means of the electric motor with dynamics sufficient for an ABS functionality. It is advantageous that such an ABS functionality can be realized by simply combining an already existing electric drive motor and an already existing (hydraulic) brake system with only a single additional component in the form of a valve.

According to an example embodiment of the present invention, a corresponding control logic can be implemented, for example, in a control unit of the electric motorcycle. A wheel speed sensor is not absolutely necessary since the rotational wheel speed can also be determined, for example, from the rotational motor speed of the electric motor using any internal Hall sensors thereof.

A second aspect of the present invention relates to a control unit. The control unit comprises a processor which is configured to perform the method according to an embodiment within the meaning of the first aspect of the present invention. Features of the method according to an embodiment within the meaning of the first aspect of the present invention can also be features of the control unit, and vice versa.

According to an example embodiment of the present invention, the control unit can comprise hardware and/or software modules. In addition to the processor, the control unit can comprise a memory and data communication interfaces for data communication with peripheral devices.

A third aspect of the present invention relates to a brake-support system for an electric motorcycle. According to an example embodiment of the present invention, the brake-support system comprises at least one electric motor for accelerating and/or braking the electric motorcycle, and a control unit according to an embodiment within the meaning of the second aspect of the present invention. Such a brake-support system can be produced particularly inexpensively. In addition, such a brake-support system can contribute to a considerable improvement in the braking power of an electric motorcycle. Accidents can thus be avoided.

A fourth aspect of the present invention relates to a computer program. The computer program comprises instructions that, when the computer program is executed by a processor, cause the processor to perform the method according to an embodiment within the meaning of the first aspect of the present invention.

A fifth aspect of the present invention relates to a computer-readable medium on which the computer program according to an embodiment within the meaning of the third aspect of the present invention is stored. The computer-readable medium can be a volatile or non-volatile data memory. For example, the computer-readable medium may be a hard disk, a USB memory device, a RAM, ROM, EPROM or flash memory. The computer-readable medium may also be a data communication network, such as the Internet or a data cloud, enabling a download of a program code.

Features of the method according to an embodiment within the meaning of the first aspect of the present invention may also be features of the computer program and/or of the computer-readable medium, and vice versa.

Ideas for embodiments of the present invention may be considered, inter alia, as being based on the concepts and findings described below.

According to one example embodiment of the present invention, the motor torque can be determined by forming a difference from the total braking torque and the maximum braking torque. In this way, the total braking torque can be determined particularly efficiently.

According to one example embodiment of the present invention, a maximum drive torque that can be generated by means of the electric motor is not smaller in terms of magnitude than the maximum braking torque. This has the effect that the braking effect of the brake system can possibly be compensated for by the braking effect of the electric motor, in particular in the event of full or emergency braking, if the brake system generates the maximum braking torque and the relevant wheel to be braked is to be prevented from blocking.

According to one example embodiment of the present invention, the method can furthermore comprise the following step: receiving measurement data indicating a current rotational speed of the electric motor. The total braking torque can in this case be determined by evaluating the measurement data. The measurement data can have been provided, for example, by means of a corresponding rotational speed sensor, for example in the form of a Hall sensor. An estimation of the rotational speed based on measured phase voltages and/or phase currents of the electric motor is also possible. In this way, the use of a separate wheel speed sensor can be dispensed with. The production costs of the brake-support system can thus be further reduced.

According to one example embodiment of the present invention, the brake-support system can furthermore comprise a brake system for braking the electric motorcycle. In this case, the brake system can be adapted such that a maximum braking torque that can be generated by means of the brake system is not greater in terms of magnitude than a maximum drive torque that can be generated by means of the electric motor. The brake system can, for example, be a hydraulic front and/or rear wheel brake. As mentioned at the outset, the brake system can, for example, comprise an inlet valve, an outlet valve, a storage chamber and a check valve. The brake pressure that can be generated by a driver by actuating a brake lever or brake pedal can thus be limited in a technically efficient manner such that the maximum braking torque of the brake system can be compensated for by the maximum drive torque of the electric motor.

According to one example embodiment of the present invention, the brake system can comprise a hydraulic brake circuit and at least one brake pressure valve for limiting a brake pressure in the hydraulic brake circuit to a value corresponding to the maximum drive torque. In other words, the maximum brake pressure in the hydraulic brake circuit can be limited such that the maximum braking torque of the brake system is at most as great in terms of magnitude as the maximum drive torque. The brake pressure valve can, for example, be an isolating valve which decouples the master cylinder from the slave cylinder when a particular brake pressure is reached. The isolating valve can be controllable, for example, by means of the control unit of the electric motorcycle on the basis of a measured current brake pressure in the hydraulic brake circuit. This has the advantage that the maximum braking torque can be varied depending on the driving situation, for example depending on the road surface. Alternatively, the brake pressure valve can be designed as a simple pressure limiting valve, for example as a check valve, i.e., as a passive component which limits the brake pressure to a fixed value corresponding to the maximum drive torque of the electric motor.

BRIEF DESCRIPTION OF THE DRAWINGS

Embodiments of the present invention are described below with reference to the figures, and neither the figures nor the description should be construed as limiting the present invention.

The figures are merely schematic and not true to scale. In the figures, identical reference signs refer to identical or identically acting features.

DETAILED DESCRIPTION OF EXAMPLE EMBODIMENTS

Figure 1:
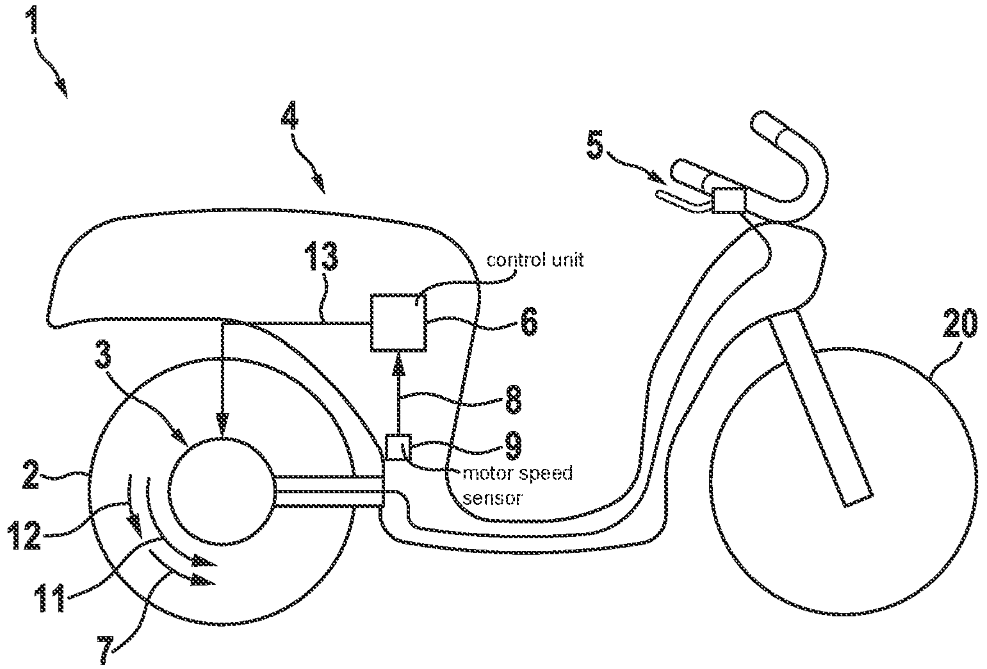
FIG. 1 shows an electric motorcycle with a brake-support system according to an exemplary embodiment of the present invention.

FIG. 1 shows an electric motorcycle 1, here an electric scooter, which is driven at its rear wheel 2 by an electric motor 3. The electric motor 3 is part of a brake-support system 4 which, in addition to the electric motor 3, comprises a brake system 5, here a hydraulic rear wheel brake for braking the rear wheel 2, and a control unit 6 for controlling the electric motor 3.

For this purpose, the control unit 6 determines a total braking torque 7 required to brake the electric motorcycle 1 to a standstill. The total braking torque 7 can, for example, be calculated from measurement data 8 which are provided by means of a motor speed sensor 9 for measuring a rotational motor speed of the electric motor 3, in several successive time steps by the control unit 6 in the event of recognized full or emergency braking.

Subsequently, the control unit 6 determines from the total braking torque 7, taking into account a maximum braking torque 11 that can be generated at the rear wheel 2 by means of the brake system 5, a motor torque 12 which is to be generated at the rear wheel 2 by the electric motor 3 in addition to the brake system 5.

In the simplest case, the motor torque 12 can be determined by subtracting the maximum braking torque 11 from the total braking torque 7. Alternatively, it is possible that, at a given value of the total braking torque 7, a corresponding value for the motor torque 12 is read out from a lookup table stored in the control unit 6.

Depending on the total braking torque 7, the motor torque 12 can be opposite to a direction of the maximum braking torque 11 or, as shown in FIG. 1, act in the same direction as the maximum braking torque 11.

The brake system 5 and/or the electric motor 3 can be designed such that the sum of the maximum (negative) motor torque 12 and the maximum braking torque 11 corresponds to the maximum total braking torque 7 that can be maximally required for braking the electric motorcycle 1.

Additionally or alternatively, the brake system 5 and/or the electric motor 3 can be designed such that the maximum (positive) motor torque 12 corresponds to the maximum braking torque 11, i.e., is not smaller in terms of magnitude than the maximum braking torque 11. This makes it possible to possibly cancel the braking effect of the brake system 5 by means of the electric motor 3.

Finally, on the basis of the motor torque 12, the control unit 6 generates a corresponding control command 13 for controlling the electric motor 3, as a result of which both the maximum braking torque 11 and the motor torque 12, and thus the previously determined total braking torque 7, are applied to the rear wheel 2 in the event of emergency or full braking.

Figure 2:
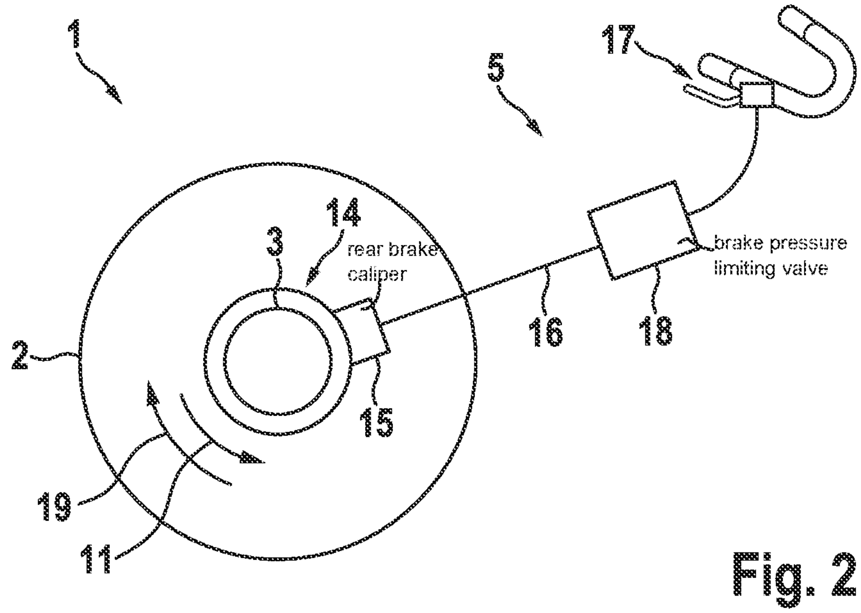
FIG. 2 is a detailed view of a brake system of the brake-support system of FIG. 1.

FIG. 2 shows the brake system 5 in detail. It comprises, by way of example, a rear brake disk 14, which is connected to the rear wheel 2 in a rotationally fixed manner, and a rear brake caliper 15, which is hydraulically connected via a hydraulic brake circuit 16 to a master cylinder 17 on the handlebar of the electric motorcycle 1.

In the hydraulic brake circuit 16, between the rear brake caliper 15 and the master cylinder 17 is arranged a brake pressure limiting valve 18 via which the hydraulic brake pressure in the brake system 5 is limited.

The brake pressure limiting valve 18 is configured such that the hydraulic brake pressure can only be so large that the maximum braking torque 11 generated at the rear wheel 2 by means of the rear brake caliper 14 is in terms of magnitude at most equal to a maximum drive torque 19 of the electric motor 3.

The brake pressure limiting valve 18 can be designed, for example, as a check valve or an electrically controllable isolating valve with a variable or constant barrier pressure.

Alternatively, the brake system 5 can be realized as a hydraulic front wheel brake for braking a front wheel 20 of the electric motorcycle 1 (see FIG. 1) or can comprise such a front wheel brake in addition to the rear wheel brake.

Figure 3:
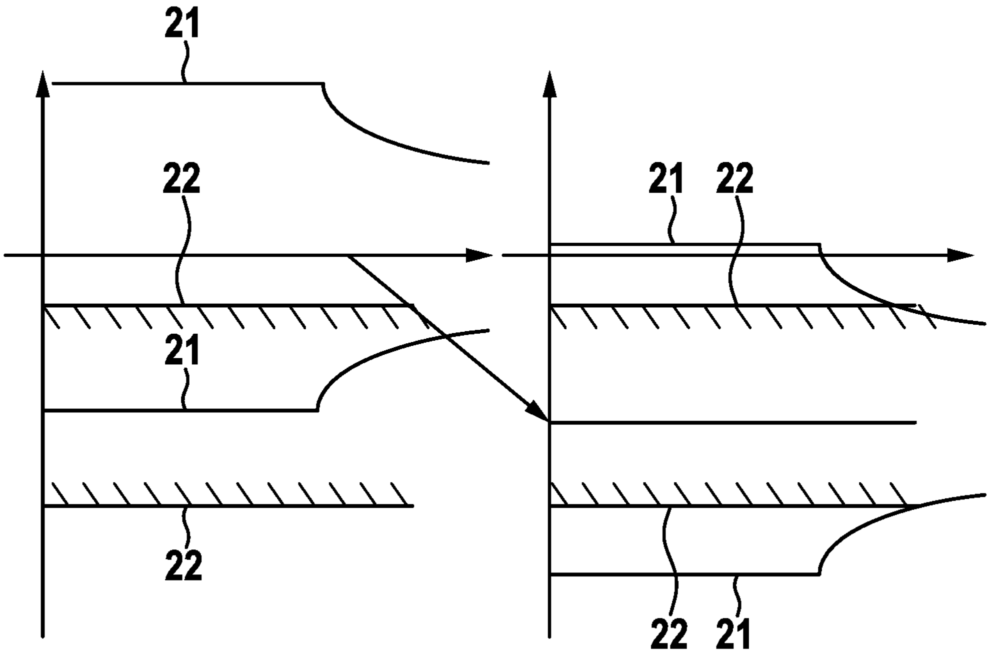
FIG. 3 shows a diagram for comparing working ranges of an electric motor to a brake system of the brake-support system of FIG. 1.

FIG. 3 shows how a motor working range 21 of the electric motor 3 and a brake working range 22 of the brake system 5, i.e., a required ABS working range, are shifted relative to one another by limiting the hydraulic brake pressure by means of the brake pressure limiting valve 18, in order to obtain the desired combination of the two braking effects. The relevant torque is plotted on the ordinate, and the speed of the electric motorcycle 1 is plotted on the abscissa.

In conclusion, it is pointed out that terms like "having," "comprising," etc. do not exclude other elements or steps and terms like "a" or "an" do not exclude a multiplicity.

The invention claimed is:

1. A method for operating a brake-support system for an electric motorcycle, the method comprising:
determining a total braking torque required to brake the electric motorcycle;
determining a motor torque to be generated using an electric motor of the electric motorcycle, based on the total braking torque and a maximum braking torque that can be generated using a brake system of the electric motorcycle; and
generating a control command for controlling the electric motor in response to the brake system generating a maximum braking torque, such that the motor torque is generated in addition to the maximum braking torque.

2. The method according to claim 1, wherein the motor torque is determined by forming a difference from the total braking torque and the maximum braking torque.

3. The method according to claim 1, wherein a maximum drive torque that can be generated using the electric motor is not smaller in terms of magnitude than the maximum braking torque.

4. The method according to claim 1, further comprising:
receiving measurement data indicating a current rotational speed of the electric motor;
wherein the total braking torque is determined by evaluating the measurement data.

5. A control unit, comprising:
a processor configured to operate a brake-support system for an electric motorcycle, the processor configured to:
determine a total braking torque required to brake the electric motorcycle;
determine a motor torque to be generated using an electric motor of the electric motorcycle, based on the total braking torque and a maximum braking torque that can be generated using a brake system of the electric motorcycle; and
generate a control command for controlling the electric motor in response to the brake system generating a maximum braking torque, such that the motor torque is generated in addition to the maximum braking torque.

6. A brake-support system for an electric motorcycle, wherein the brake-support system comprises:
an electric motor for accelerating and/or braking the electric motorcycle; and
a control unit, including:
a processor configured to operate the brake-support system, the processor configured to:
determine a total braking torque required to brake the electric motorcycle;
determine a motor torque to be generated using the electric motor of the electric motorcycle, based on the total braking torque and a maximum braking torque that can be generated using a brake system of the electric motorcycle; and
generate a control command for controlling the electric motor in response to the brake system generating a maximum braking torque, such that the motor torque is generated in addition to the maximum braking torque.

7. The brake-support system according to claim 6, further comprising:
the brake system for braking the electric motorcycle;
wherein the brake system is adapted such that the maximum braking torque that can be generated using the brake system is not greater in terms of magnitude than a maximum drive torque that can be generated using the electric motor.

8. The brake-support system according to claim 7, wherein the brake system includes a hydraulic brake circuit, and at least one brake pressure valve configured to limit a brake pressure in the hydraulic brake circuit to a value corresponding to the maximum drive torque.

9. A non-transitory computer-readable medium on which is stored a computer program for operating a brake-support system for an electric motorcycle, the computer program, when executed by a processor, causing the processor to perform the following steps:
determining a total braking torque required to brake the electric motorcycle;
determining a motor torque to be generated using an electric motor of the electric motorcycle, based on the total braking torque and a maximum braking torque that can be generated using a brake system of the electric motorcycle; and
generating a control command for controlling the electric motor in response to the brake system generating a maximum braking torque, such that the motor torque is generated in addition to the maximum braking torque.

* * * * *